United States Patent [19]

Piaget

[11] 4,059,320

[45] Nov. 22, 1977

[54] SAFETY PLUG UNIT

[76] Inventor: Robert E. Piaget, 11563 Grooms Road, Cincinnati, Ohio 45242

[21] Appl. No.: 771,545

[22] Filed: Feb. 24, 1977

[51] Int. Cl.$^2$ .......................... H01R 31/08; F16P 3/00

[52] U.S. Cl. .......................................... 339/19; 100/53

[58] Field of Search ........... 339/19, 45 R, 222, 219 R; 100/53

[56] References Cited

U.S. PATENT DOCUMENTS 2,660,715 11/1953 Glass ...................................... 339/19

*Primary Examiner*—Roy Lake
*Assistant Examiner*—Neil Abrams
*Attorney, Agent, or Firm*—James W. Pearce; Roy F. Schaeperklaus

[57] ABSTRACT

A male safety plug unit which fits a female unit to form a connection between contacts of the female unit. The male unit includes a body having sockets in end portions. A U-shaped connector member has arms which extend through bores which connect the sockets and includes a central portion exposed in a first one of the sockets. End portions of the arms are exposed in the second socket. An end cap is mounted in said first socket and engages the central portion of the U-shaped connector member to hold the U-shaped connector member in position. A chain socket in the end cap receives a chain link, a fastener extends through walls of the first socket and through walls of the chain socket to hold the chain link, the body, the end cap, and the U-shaped connector member in assembled relation.

7 Claims, 19 Drawing Figures

FIG. 1
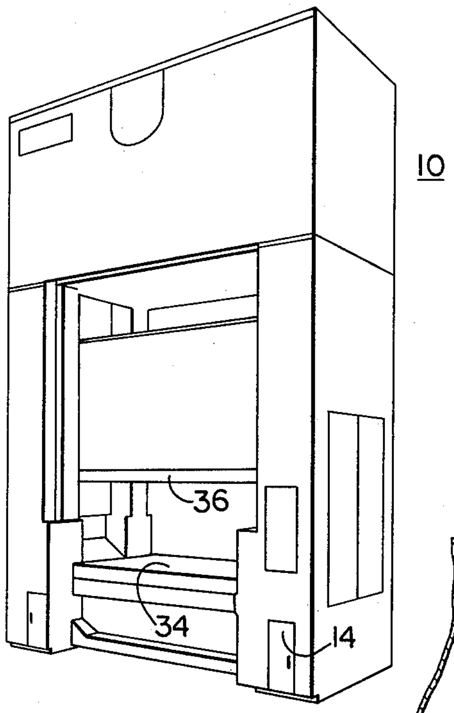
FIG. 2
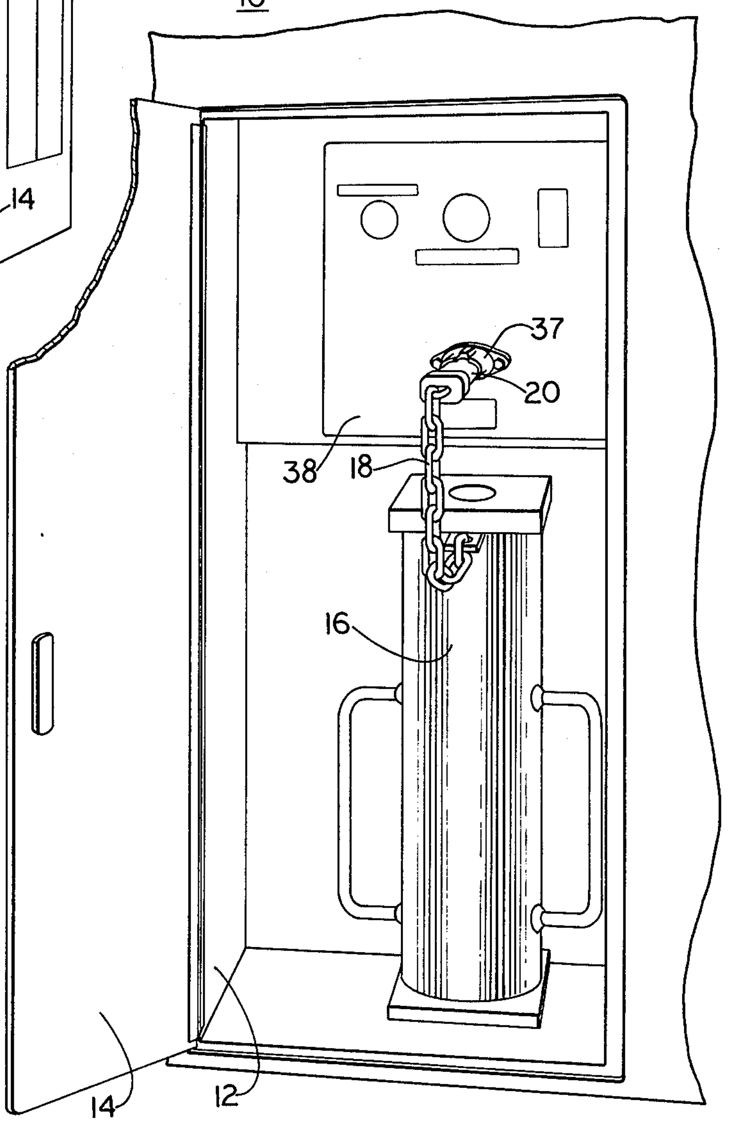
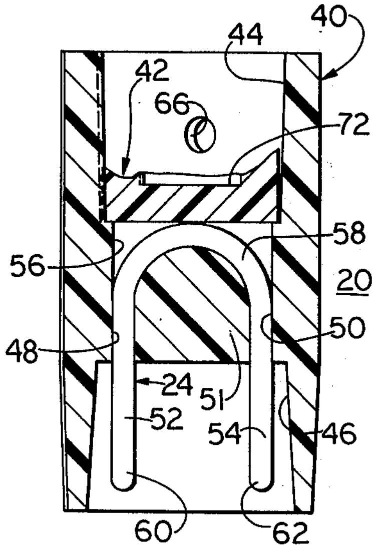
FIG. 19

SAFETY PLUG UNIT

This invention relates to cable connecting devices. More particularly, this invention relates to a safety plug for an electrical control system of a press or the like.

An object of this invention is to provide a safety plug assembly which includes a U-shaped male connector member and a chain which supports and is insulated from the male connector member.

A further object of this invention is to provide such a safety plug assembly which includes a dielectric male body having a seat in which the male connector member is mounted, a dielectric male end cap which holds the male connector member in position on the seat, and a fastener which holds the male body and the male end cap in assembled relation and forms support for an end of the chain.

A further object of this invention is to provide a female receptacle unit for the safety plug assembly which includes a female body having seats for socket members which receive end portions of the male connector member, and a female end cap which holds the socket members in position in their seats.

The above and other objects and features of the invention will be apparent to those skilled in the art to which this invention pertains from the following detailed description and the drawings, in which:

FIG. 1 is a perspective view of a press machine which includes a safety plug constructed in accordance with an embodiment of this invention;

FIG. 2 is a perspective view on an enlarged scale of a fragmentary portion of the press machine showing the die safety plug assembly and a die safety block in storage position;

FIG. 19 is a view in section of the male body and the male conductor taken on the line 19—19 in FIG. 12, a fragmentary portion of the male end cap being shown in association therewith.

In the following detailed description and the drawing, like reference characters indicate like parts.

Figure 4:
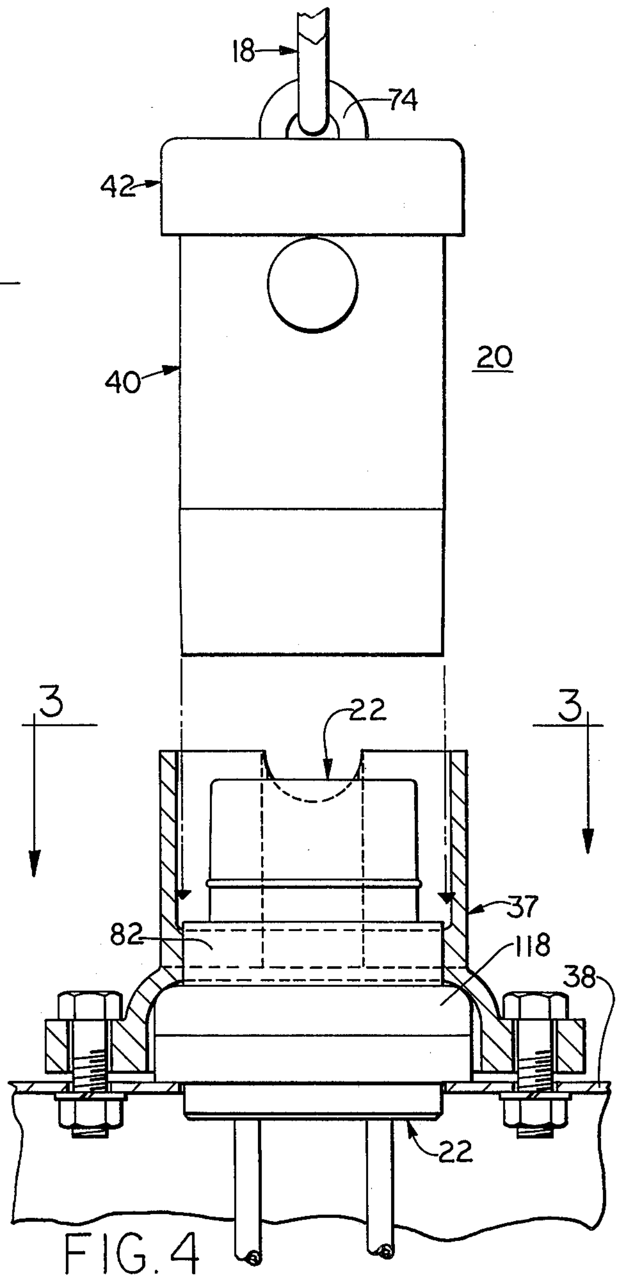
FIG. 4 is an exploded view partly in side elevation and partly in section, of the male unit and the female unit together with fragmentary portions of a chain and of the supporting structure.

In FIGS. 1 and 2 is shown a press machine 10 which includes a compartment 12. The compartment 12 is normally closed by a door 14. A safety block 16 can be stored in the compartment 12 when not in use. One end of a chain 18 is attached to the block 16. The other end of the chain 18 is attached to a male safety plug unit 20. When the safety block 16 is in the compartment 12, the male safety plug unit can be mounted in a female safety plug unit 22 (FIGS. 4 and 5) so that a U-shaped male connector member 24 (FIG. 5) can form a connection between female contact members 26 and 28.

Figure 16:
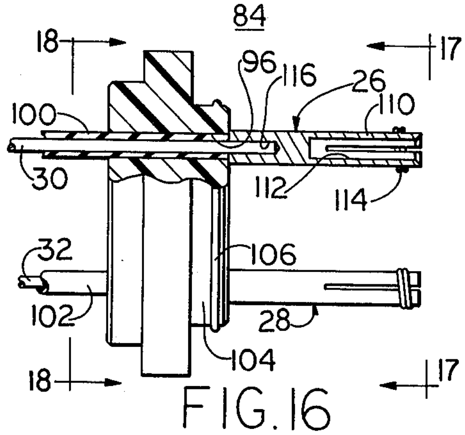
FIG. 16 is a view partly in side elevation and partly in section of a female end cap, female sockets, and conductors attached to the female sockets.
Figure 17:
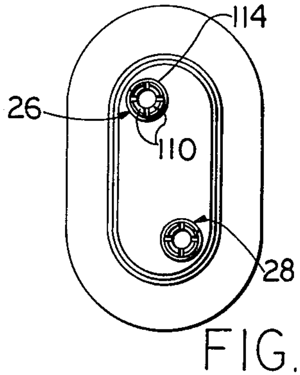
FIG. 17 is a view in end elevation looking in the direction of the arrows 17—17 in FIG. 16.
Figure 14:
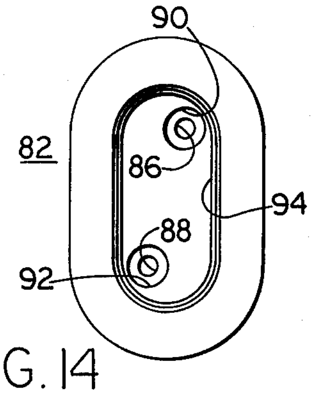
FIG. 14 is a view in end elevation looking in the direction of the arrows 14—14 in FIG. 13.
Figure 13:
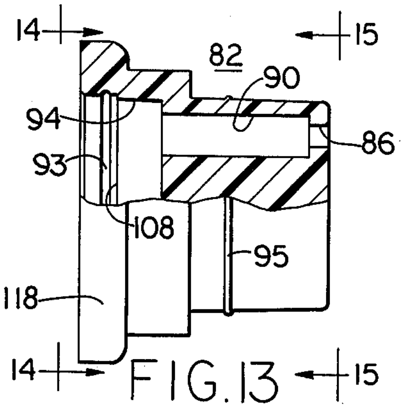
FIG. 13 is a view partly in side elevation and partly in section of a female body of the device.
Figure 15:
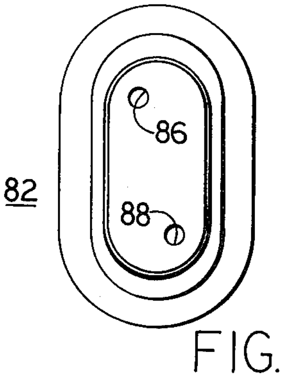
FIG. 15 is a view in end elevation looking in the direction of the arrows 15—15 in FIG. 13.
Figure 11:
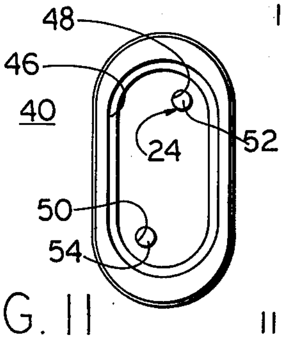
FIG. 11 is a view in end elevation looking in the direction of the arrows 11—11 in FIG. 10.
Figure 10:
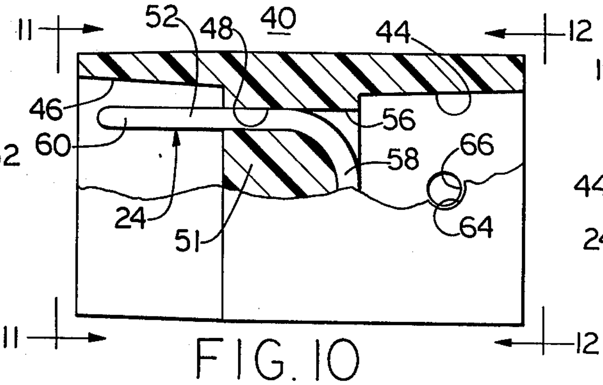
FIG. 10 is a view partly in side elevation and partly in section of a male body and of a male conductor mounted therein.
Figure 12:
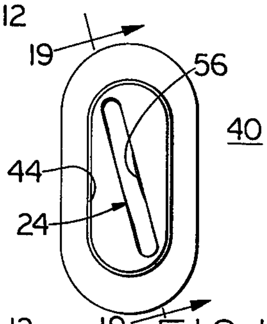
FIG. 12 is a view in end elvation looking in the direction of the arrows 12—12 in FIG. 10.
Figure 7:
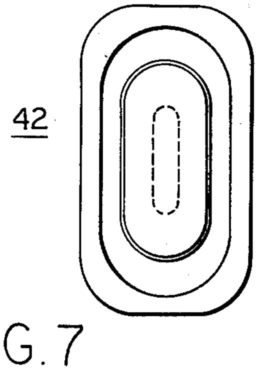
FIG. 7 is a view in end elevation of a male end cap of the device.
Figure 8:
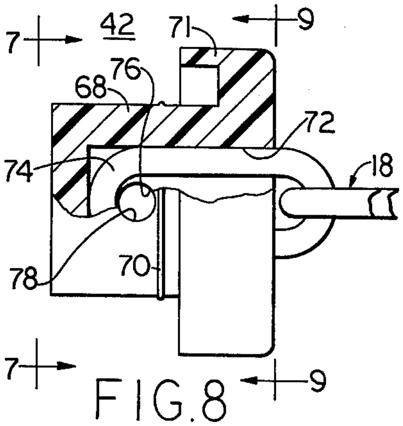
FIG. 8 is a view partly in side elevation and partly in section of the male end cap, a fragmentary portion of a chain being shown in association therewith.
Figure 9:
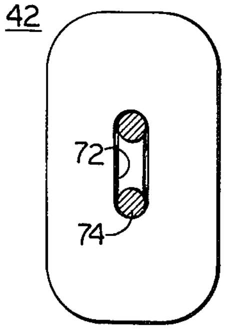
FIG. 9 is a view in section taken on the line 9—9 in FIG. 8.

As shown in FIG. 16, the female contact members 26 and 28 are attached to conductors 30 and 32, respectively. The conductors 30 and 32 can be in line with electrical control circuitry of the press machine so that the press machine cannot be operated when the male safety plug unit 20 is separated from the female safety plug unit 22. The safety block 16 is of the type which can be placed on a work table 34 of the press machine 10 underlying a ram 36 thereof to prevemt descent of the ram 36. The female safety plug unit 22 is mounted in a housing 37 (FIG. 4), which is attached to a wall panel 38 of the compartment 12 so that, before the safety block 16 is removed from the compartment 12 for placing on the work table 34, the male safety plug unit 20 must be separated from the female safety plug unit 22; and the electrical circuitry of the machine cannot be operated until the satfety block 16 is replaced in the compartment 12 and the male safety plug unit 20 is assembled with the female safety plug unit 22.

Details of construction of the male safety plug unit 20 are shown in FIGS. 4, 5, 7-12 and 19. The male safety plug unit 20 includes a male body 40 and a male end cap 42, both of which are formd of dielectric plastic resin material such as that known as Hytrel, a trademark of E. I. duPont deNemours and Company. The body is provided with a first socket 44 in one end portion thereof and a second socket 46 in an opposite end portion thereof. Elongated bores 48 and 50 in a central block portion 51 of the male body 40 connect the sockets 44 and 46. Portions of arms 52 and 54 of the U-shaped male connector member 24 extend through the bores 48 and 50, resepectively. A slot 56 in the block portion 51 at the bottom of the first socket 44 receives a central curved portion 58 of the male connector member 24. End portions 60 and 62 of the arms 52 and 54, respectively, extend into the socket 46. Aligned transverse bores 64 and 66 are provided in walls of the socket 44.

Figure 6:
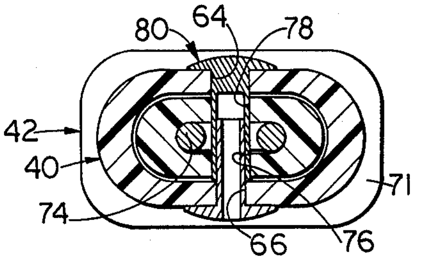
FIG. 6 is a view in section taken on the line 6—6 in FIG. 5.
Figure 3:
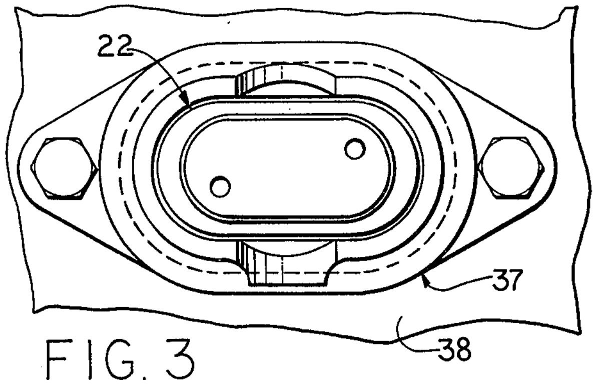
FIG. 3 is a view in end elevation of a female safety plug unit and supporting structure therefor of the safety plug assembly shown in FIG. 2 looking in the direction of the arrows 3—3 in FIG. 4.
Figure 18:
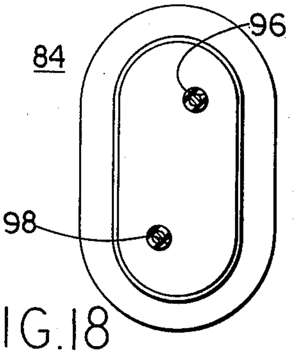
FIG. 18 is a view in section taken on the line 18—18 in FIG. 16.

The male end cap 42 includes a main block portion 68, which fits inside the first socket 44 of the male body 40. An annular rib 70 on the main block portion forms a seal with the inner face of the wall of the sockt 44. An annular angle-shaped flange 71 on an outer end section of the block portion 68 can overlie the edge of the socket 44. A chain socket 72 in the block portion 68 can receive an end link 74 of the chain 18. Transverse openings 76 and 78 in the walls of the chain socket 72 receive a rivet assembly 80 (FIG. 6). The rivet assembly 80 also extends through the chain end link 74 and through the openings 64 and 66 in the walls of the socket 44 of the male body 40 to hold the male body 40, the male end cap 42, the chain end link 74 and the male connector member 24 in assembled relation.

Figure 5:
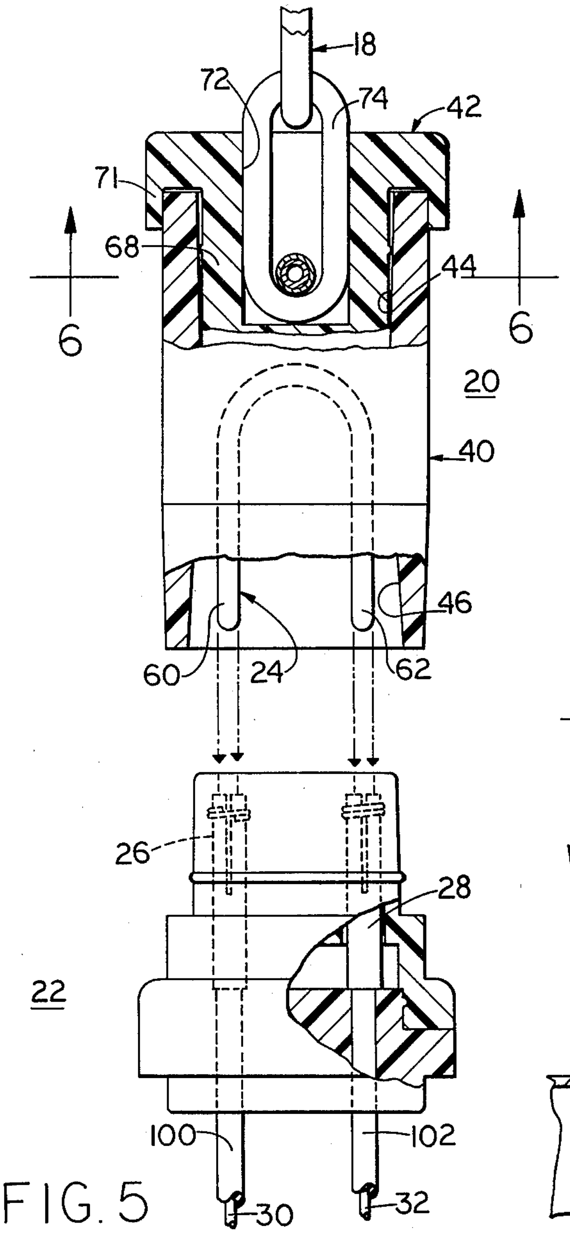
FIG. 5 is an exploded view partly in side elevation and partly in section of the male unit and of the female unit.

Details of construction of the female safety plug unit 22 are shown in FIGS. 3–5 and 13–18 inclusive. The female safety plug unit 22 includes a female body 82 and a female end cap 84, both of which can be formed of Hytrel. The female body is provided with lengthwise bores 86 and 88, into which the end portions 60 and 62 of the male connector member 24 can extend. Counterbores 90 and 92 receive the female socket members 26 and 28. A socket 94, into which the counterbones 90 and 92 open, is provided with an internal groove 93. An exterior annular rib 95 in the female body 82 can form a seal with the interior of the wall of the second socket 46 of the male body 40 when the male and female units are assembled as shown in FIG. 5.

The female end cap 84 is provided with bores 96 and 98 which receive insulation coatings 100 and 102 of the conductors 30 and 32. A lug 104 of the female end cap 84 is received inside the socket 94 of the female body 82 with an annular rib 106 of the female end cap 84 being received in the internal groove 93 to lock the female end cap 84 and the female body 82 in assembled relation with a shoulder 108 of the female body 82 engaged by an end portion of the lug 104 to form a seal between the female body 82 and the female end cap 84.

As shown in FIG. 16, the female contact member 26 includes a plurality of teeth 110 at one end thereof which define a socket 112 in which the end portion of one of the arms of the male connector member 24 can be received. A helical spring 114 urges the teeth 110 inwardly so that the teeth 110 can firmly grip the end portion of the arm of the male connector member 24. An axial bore 116 at the other end thereof forms a socket for an end of the conductor 30. The female contact member 28 is similarly constructed.

The female safety plug unit 22 is mounted inside the housing 37 with a flange 118 of the female body 82 engaged by the housing 37 so that the female safety plug unit is firmly anchored to the wall panel 38, and the safety block 16 cannot be removed from the compartment 12 (FIG. 2) without separating the male safety plug unit 20 from the female safety plug unit 22.

The safety plug structure illustrated in the drawings and described above is subject to structural modification without departing from the spirit and scope of the appended claims.

Having described my invention, what I claim as new and desire to secure by letters patent is:

1. A safety plug unit which comprises a body, there being sockets in end portions of the body, there being a pair of bores connecting the sockets, a U-shaped connector member having arms which extend through the bores and a central portion exposed in a first one of the sockets, end portions of the arms being exposed in the second socket, there being aligned transverse openings in walls of said first socket, an end cap mounted in said first socket and engageable with the central portion of the U-shaped connector member to hold the U-shaped connector member in position, there being a chain socket and aligned transverse openings in walls of the chain socket in the end cap intersecting the chain socket, a chain link received in the chain socket, and fastener means extending through the chain link, the transverse openings in the walls of the first socket and the transverse openings in the walls of the chain socket to hold the chain link, the body, the end cap, and the U-shaped connector member in assembled relation.

2. The combination of a safety plug unit in accordance with claim 1 with a female plug unit which comprises a female body for receiving in the second socket, there being a pair of contact members mounted in the female body and engageable with the arms of the connector member so that the connector member forms an electrical connection between the contact members.

3. The combination of claim 2 which includes a stationary panel, means for mounting the female plug unit on the stationary panel, a movable block, and means for attaching the chain to the movable block, whereby the plug units are separated when the block is moved from the panel to release the electrical connection between the contact members.

4. A safety plug unit which comprises a body, there being sockets in end portions of the body, there being a pair of bores connecting the sockets, a U-shaped connector member having arms which extend through the bores and a central portion exposed in a first one of the sockets, end portions of the arms being exposed in the second socket, there being aligned transverse openings in walls of said first socket, and end cap mounted in said first socket and engageable with the central portion of the U-shaped connector member to hold the U-shaped connector member in position, there being a transverse opening in the end cap and fastener means extending through the transverse opening in walls of the first socket and the transverse opening in the end cap to hold the body, the end cap, and the U-shaped connector member in assembled relation.

5. The combination of a safety plug unit in accordance with claim 4 with a female plug unit which comprises a female body for receiving in the second socket, there being a pair of contact members mounted in the female body and engageable with the arms of the connector member so that the connector member forms an electrical connection between the contact members.

6. The combination of claim 5 which includes means for attaching a chain to one of the plug units.

7. The combination of claim 6 which includes a stationary panel, means for mounting the other plug on the stationary panel, a movable block, and means for attaching the chain to the movable block, whereby the plug units are separated when the block is moved from the panel to release the electrical connection between the contact members.

* * * * *

UNITED STATES PATENT OFFICE

CERTIFICATE OF CORRECTION

Patent No. 4,059,320 Dated November 22, 1977

Inventor(s) Robert E. Piaget

It is certified that error appears in the above-identified patent and that said Letters Patent are hereby corrected as shown below:

Column 4, line 40 (the 13th line in claim 4), "opening" should be -- openings --.

Signed and Sealed this

*Fourteenth* Day of *March 1978*

[SEAL]

*Attest:*

RUTH C. MASON
*Attesting Officer*

LUTRELLE F. PARKER
*Acting Commissioner of Patents and Trademarks*